(12) United States Patent
Shin (10) Patent No.: US 11,982,807 B1
(45) Date of Patent: May 14, 2024

(54) PICTURE GENERATING APPARATUS COMPRISING A FUNNEL REFLECTOR HAVING A DOUBLE FUNNEL STRUCTURE FOR USE IN A HEAD-UP DISPLAY

(71) Applicant: HYUNDAI MOBIS CO., LTD., Seoul (KR)

(72) Inventor: Min Ho Shin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/175,691

(22) Filed: Feb. 28, 2023

(30) Foreign Application Priority Data

Dec. 28, 2022 (KR) .................. 10-2022-0187661

(51) Int. Cl.
| | | |
|---|---|---|
| *G02B 27/01* | (2006.01) | |
| *B60K 35/00* | (2006.01) | |
| *B60K 35/23* | (2024.01) | |
| *G02F 1/1335* | (2006.01) | |

(52) U.S. Cl.
CPC .......... *G02B 27/0101* (2013.01); *B60K 35/00* (2013.01); *G02B 27/0149* (2013.01); *G02F 1/133504* (2013.01); *G02F 1/133607* (2021.01); *B60K 35/23* (2024.01); *G02B 2027/0141* (2013.01); *G02B 2027/0161* (2013.01)

(58) Field of Classification Search
CPC .................. G02B 2027/0161; B60K 2360/691
See application file for complete search history.

(56) References Cited

U.S. PATENT DOCUMENTS

| | | | | |
|---|---|---|---|---|
| 5,841,496 | A * | 11/1998 | Itoh .................... | G02F 1/133553 349/40 |
| 6,320,759 | B1 * | 11/2001 | Tusan .................. | H05K 7/1461 206/706 |
| 7,095,562 | B1 * | 8/2006 | Peng .................. | G02B 27/0101 359/290 |
| 2019/0346676 | A1 * | 11/2019 | Hirata .................. | H04N 9/3179 |

FOREIGN PATENT DOCUMENTS

WO  WO-2015182892 A1 * 12/2015 ............. B60K 35/00

* cited by examiner

*Primary Examiner* — Paul C Lee
(74) *Attorney, Agent, or Firm* — NovoTechIP International PLLC

(57) ABSTRACT

An apparatus for generating pictures for a head-up display includes: a printed circuit board (PCB) including a plurality of light sources; a liquid crystal display (LCD) disposed in front of the plurality of light sources and forming display images based on light emitted from the plurality of light sources; a funnel reflector including an internal optical surface including a double funnel structure and disposed between the PCB and the LCD to guide the light to the LCD; a housing including a space for accommodating the funnel reflector and including, on an upper surface thereof, an LCD seat for accommodating the LCD and a diffuser seat formed at the same angle as the LCD seat; and a diffuser accommodated in the diffuser seat, wherein the funnel reflector includes a tapered top surface and the top surface is formed at an angle corresponding to an angle of the diffuser seat to maintain a uniform distance from the diffuser.

20 Claims, 7 Drawing Sheets

PICTURE GENERATING APPARATUS COMPRISING A FUNNEL REFLECTOR HAVING A DOUBLE FUNNEL STRUCTURE FOR USE IN A HEAD-UP DISPLAY

CROSS-REFERENCE TO RELATED APPLICATIONS

This application claims the benefit of and priority to Korean Patent Application No. 10-2022-0187661, filed on Dec. 28, 2022, the entire contents of which are incorporated herein by reference.

TECHNICAL FIELD

The present disclosure relates to an apparatus for generating pictures for a head-up display.

BACKGROUND

The contents described in the present section are only to provide background information for the present disclosure and are not to describe the related art.

A head-up display is a device for displaying driving information, which has been developed for a driver's safe driving. Driving information is formed in the form of an image in an apparatus for generating pictures and passes through an optical system. The driving information passed through the optical system is projected onto a windshield of a vehicle or a translucent reflective screen disposed inside a vehicle to be provided to a driver. An apparatus for generating pictures includes a liquid crystal display (LCD) that forms an image and a back light unit (BLU) disposed at the rear of the LCD to project the image to an optical system inside a head-up display. Here, the BLU includes a diffuser, a housing funnel, a printed circuit board (PCB), and a heat sink.

The head-up display needs to be capable of providing an image recognizable to a driver even in a daylight environment in the front of a vehicle. An image formed on the LCD is enlarged while passing through an optical system and then projected onto a windshield of a vehicle or a translucent reflective screen. The brightness of the final projected light image becomes lower than that of a light image on the LCD. Therefore, compared to general displays, an apparatus for generating pictures for a head-up display needs to provide a very large and uniform quantity of light.

Figure 1A:
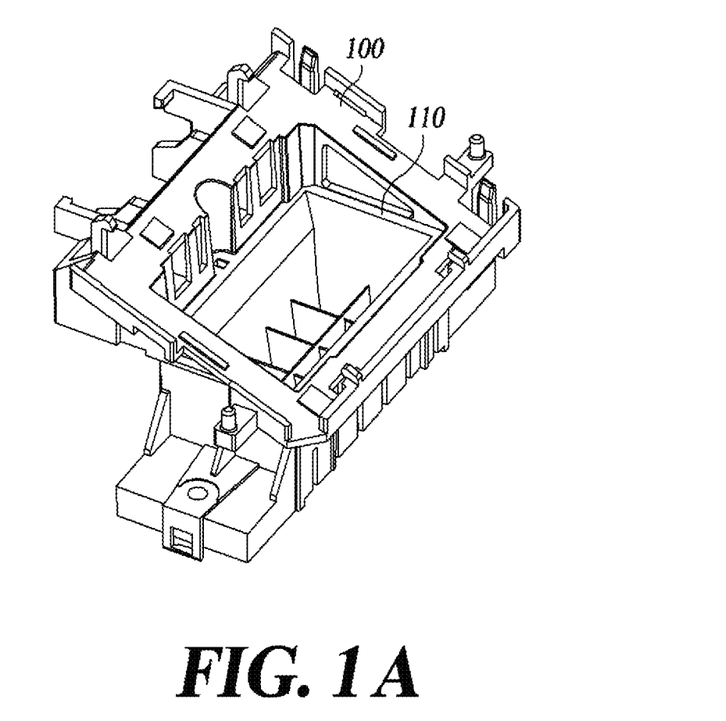
FIG. 1A is a perspective view of a housing funnel according to the related art.
Figure 1B:
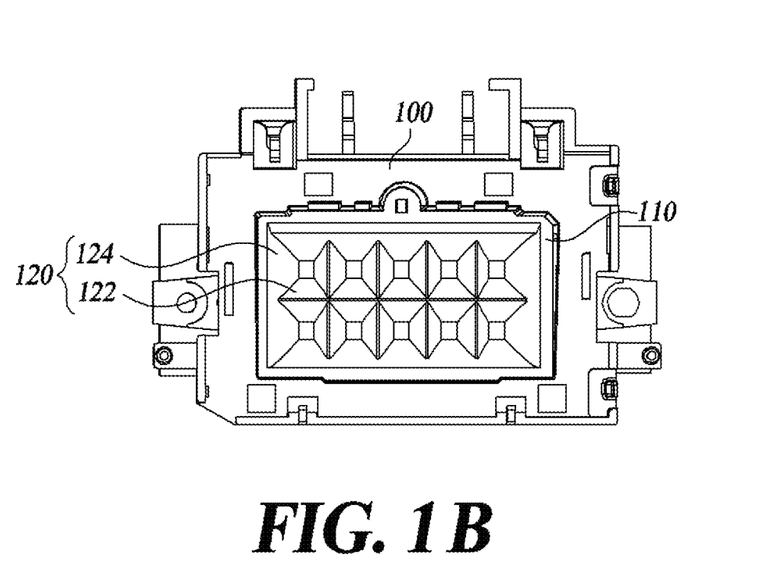
FIG. 1B is a top plan view of the housing funnel according to the related art.

FIG. 1A is a perspective view of a housing funnel according to the related art. FIG. 1B is a top plan view of the housing funnel according to the related art.

Referring to FIG. 1A and FIG. 1B, the housing funnel according to the related art may include an LCD seat 100, a diffuser seat 110, and an internal optical surface 120. Here, the internal optical surface 120 may include a first funnel 122 and a second funnel 124.

The LCD seat 100 may accommodate an LCD. The LCD seat 100 may be inclined at an angle and formed on an upper surface of the housing funnel.

The diffuser seat 110 may accommodate a diffuser. The difference between the angle of a surface of the diffuser seat 110 and the angle of a surface of the LCD seat 100 may correspond to the angle of the LCD seat 100 with respect to the angle of the diffuser seat 110. Therefore, when light emitted from a light source is emitted onto the LCD via the diffuser, the light may be refracted by the difference between the angle of the diffuser and the angle of the LCD, resulting in a low uniformity of the light.

Figure 2:
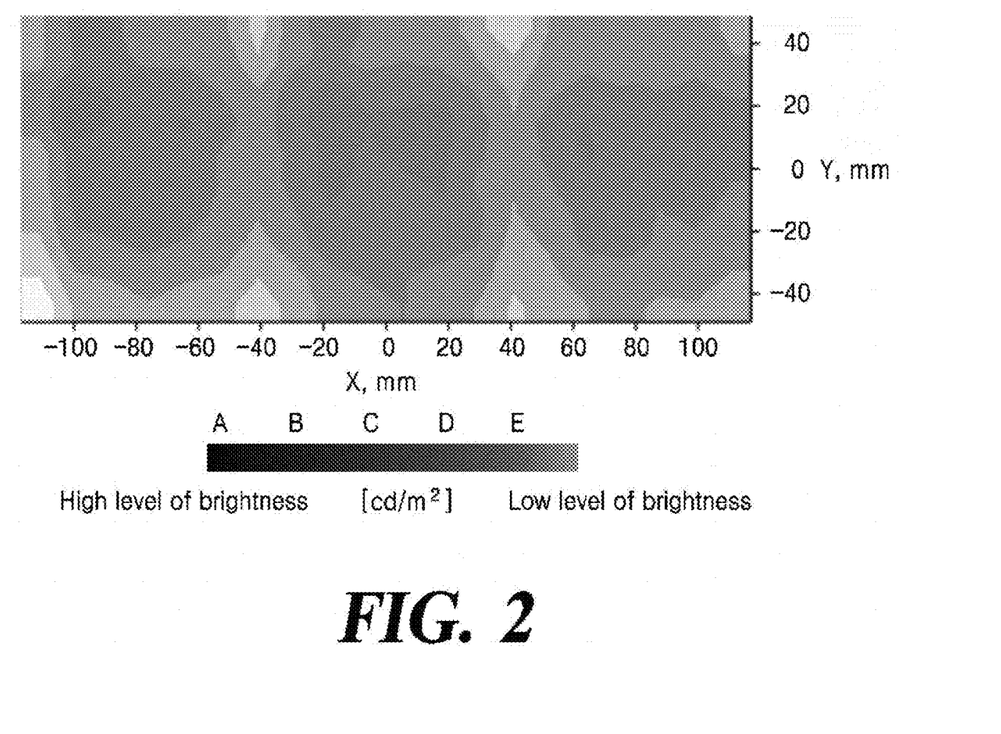
FIG. 2 is a view showing the result of a simulation of the brightness of an image according to the related art.

FIG. 2 is a view showing the result of a simulation of the brightness of an image according to the related art.

Referring to FIG. 1A, FIG. 1B and FIG. 2, the size of the display used for the simulation showing the distribution of the brightness of the image is 200 mm in width and 80 mm in length. A distribution of brightness is shown on the display for the simulation according to brightness of the light source. Areas with high brightness have a color close to black, and areas with low brightness have a color close to white. Here, the unit of the brightness of the image is $cd/m^2$, and the level of the brightness of the image is classified into grades A to E. The high brightness of the image is classified as grade A, and the low brightness of the image is classified as grade E.

According to the result of the simulation of the brightness of the image according to the related art, due to the shape of the outermost edge of the internal optical surface 120 and the light reflection structures of the first funnel 122 and the second funnel 124, the brightness at the outermost edge of the image on the display is rapidly reduced, and the overall uniformity of light is lowered.

SUMMARY

In an apparatus for generating pictures for a head-up display according to an embodiment of the present disclosure, the brightness of light emitted to an outermost edge of an LCD may be improved.

In the apparatus for generating pictures for a head-up display according to an embodiment of the present disclosure, the overall uniformity of light emitted to the LCD may be enhanced.

Problems to be solved by the present disclosure are not limited to the above-mentioned problems, and the following description will allow a person having ordinary skill in the art to clearly understand other problems not mentioned above.

According to an embodiment of the present disclosure, an apparatus for generating pictures for a head-up display includes: a printed circuit board (PCB) including a plurality of light sources; a liquid crystal display (LCD) disposed in front of the plurality of light sources and forming display images based on light emitted from the plurality of light sources; a funnel reflector including an internal optical surface including a double funnel structure and disposed between the PCB and the LCD to guide the light to the LCD; a housing including a space for accommodating the funnel reflector and including, on an upper surface thereof, an LCD seat for accommodating the LCD and a diffuser seat formed at the same angle as the LCD seat; and a diffuser accommodated in the diffuser seat, wherein the funnel reflector includes a tapered top surface and the top surface is formed at an angle corresponding to an angle of the diffuser seat to maintain a uniform distance from the diffuser.

In the apparatus for generating pictures for a head-up display according to an embodiment of the present disclosure, the brightness of light emitted to the outermost edge of the LCD may be improved.

In the apparatus for generating pictures for a head-up display according to an embodiment of the present disclosure, the overall uniformity of light emitted to the LCD may be enhanced.

DETAILED DESCRIPTION

Hereinafter, some exemplary embodiments of the present disclosure will be described in detail with reference to the accompanying drawings. In the following description, like reference numerals preferably designate like elements, although the elements are shown in different drawings. Furthermore, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary.

In describing components in the embodiments according to the present disclosure, referring to a front, rear, etc. direction is only to indicate the position and direction in which a certain component is combined with other components, and the nature, order, etc. of the component is not limited by the direction. In describing components in the embodiments according to the present disclosure, when something is described as being at the front or in a front direction, it means that it is located above a certain component, for example, on an "upper part," "upper end," and the like, and, when something is described as being at the rear or in a rear direction, it means that it is located below a certain component, for example, on a "lower part," "lower end," and the like.

Figure 3:
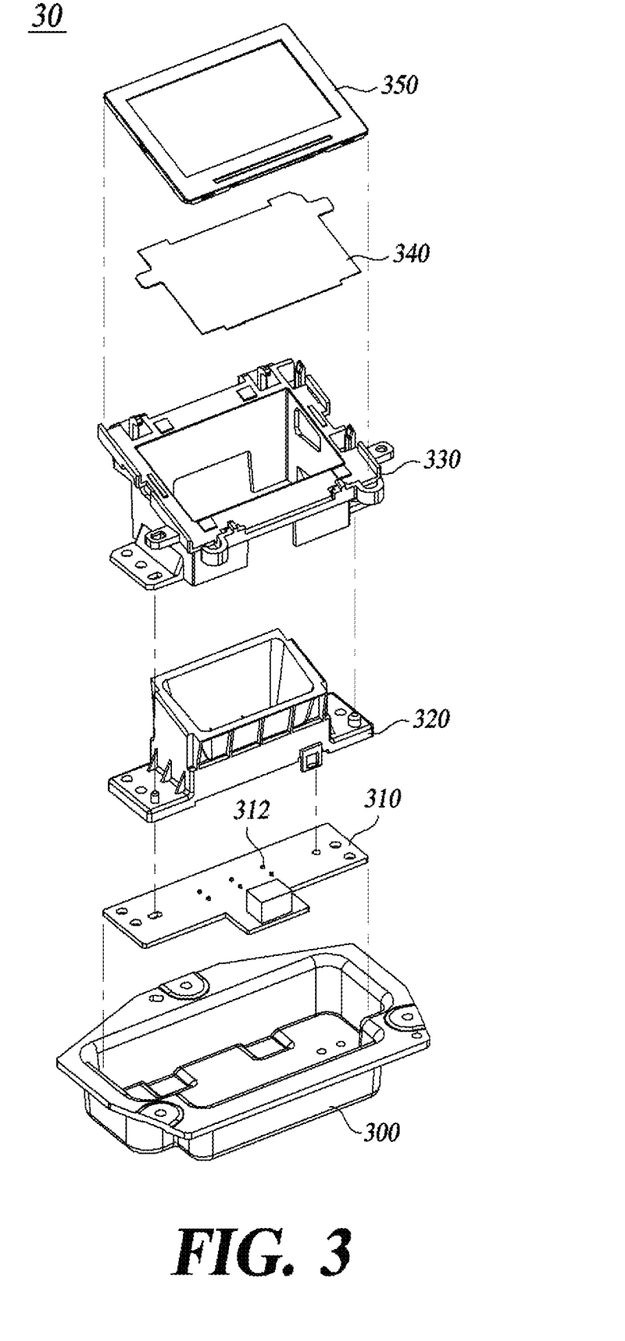
FIG. 3 is an exploded perspective view of an apparatus for generating pictures for a head-up display according to an embodiment of the present disclosure.

FIG. 3 is an exploded perspective view of an apparatus for generating pictures for a head-up display according to an embodiment of the present disclosure.

Figure 4:
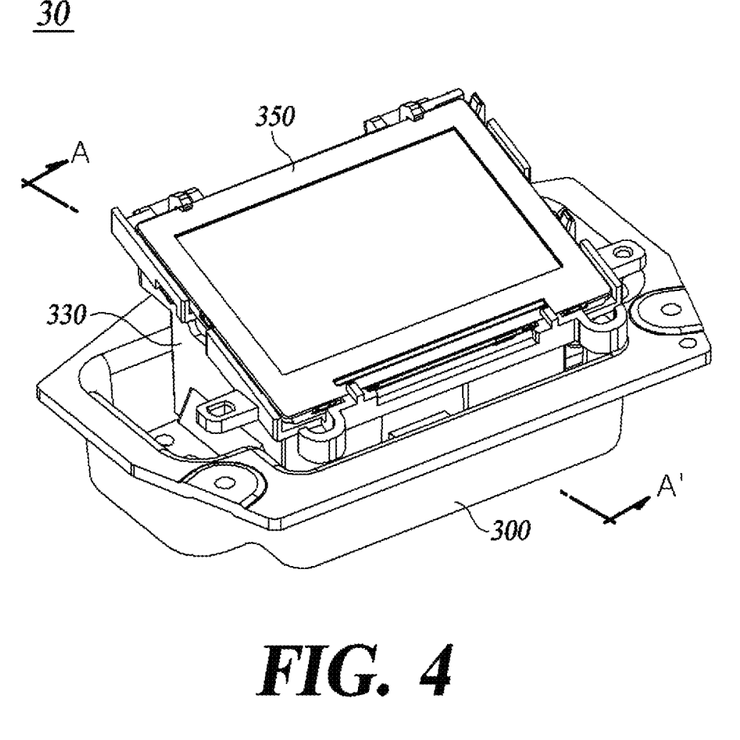
FIG. 4 is a perspective view of the apparatus for generating pictures for a head-up display according to an embodiment of the present disclosure.

FIG. 4 is a perspective view of the apparatus for generating pictures for a head-up display according to an embodiment of the present disclosure.

Referring to FIG. 3 and FIG. 4, the apparatus for generating pictures 30 may include all or some of a heat sink 300, a printed circuit board (PCB) 310, a light source 312, a funnel reflector 320, a housing 330, a diffuser 340, and a liquid crystal display (LCD) 350.

The heat sink 300 may be disposed at the rearmost of the apparatus for generating pictures 30. The heat sink 300 may dissipate heat generated inside the apparatus for generating pictures 30 to the outside.

The PCB 310 may include the light source 312. A plurality of light sources 312 may be included. The plurality of light sources 312 may be formed on one surface of the PCB 310. The plurality of light sources 312 may be formed on the PCB 310 in a predetermined arrangement pattern. Here, the light source 312 may be a light emitting diode (LED).

The funnel reflector 320 may be disposed between the PCB 310 and the LCD 350.

The funnel reflector 320 may have a double funnel structure to guide light emitted from the plurality of light sources 312 to the LCD 350.

The housing 330 may include a space for accommodating the funnel reflector 320. The housing 330 may be disposed in front of the funnel reflector 320.

The housing 330 may include an LCD seat for accommodating the LCD 350. In addition, the housing 330 may include a diffuser seat for accommodating the diffuser 340. The LCD seat and the diffuser seat may be formed on a top surface of the housing 330 at the same angle. Accordingly, the diffuser 340 may be contiguous to the LCD 350.

The LCD 350 may be fixed to the LCD seat using a plurality of latches formed on the top surface of the housing. Here, latches formed on at least one surface among the plurality of latches may have elasticity so that the LCD 350 may be easily coupled thereto.

The diffuser seat may be formed on the top surface of the housing 330. The top surface of the housing 330 may be inclined at a predetermined angle. The diffuser seat may be formed in a stepped shape to have a space in which the diffuser 340 can be seated. The diffuser seat may include a coupling groove into which a portion of the diffuser 340 can be fitted. The shape of the coupling groove may vary depending on the shape of the diffuser 340.

The LCD 350 may be disposed in front of the plurality of light sources 312. The LCD 350 may form a display image based on light emitted from the plurality of light sources 312.

Figure 5:
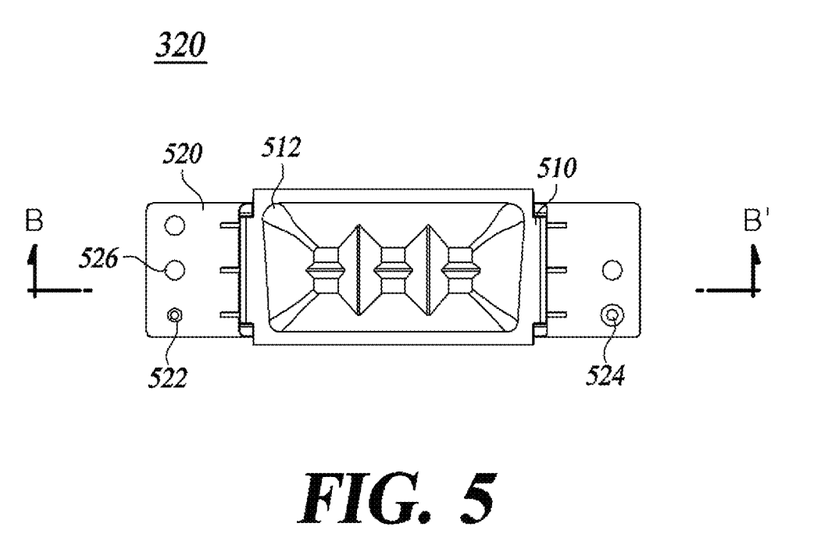
FIG. 5 is a top plan view of a funnel reflector according to an embodiment of the present disclosure.

FIG. 5 is a top plan view of the funnel reflector according to an embodiment of the present disclosure.

Referring to FIG. 5, the funnel reflector 320 may include all or some of a support unit 520, first coupling protrusions 522 and 524, a through hole 526, and a snap latch 530.

The funnel reflector 320 may include its upper face 510. The upper face 510 of the funnel reflector may be a tapered surface. The taper angle of the upper face 510 of the funnel reflector may correspond to the angle of the diffuser seat. Specifically, when the funnel reflector 320 is accommodated in the space formed inside the housing 330, the upper face 510 of the funnel reflector may be parallel to the surface of the diffuser seat and spaced apart therefrom by a predetermined distance.

The inner surface of the funnel reflector 320 may be formed as an optical surface. An outermost edge 512 of the optical surface may be filleted to be a curved surface. In the case of the filleted outermost edge 512, when light is emitted from the plurality of light sources 312 to the LCD 350, the brightness of the light emitted to an outermost edge of the LCD 350 may be improved. Here, the outermost edge 512 may include four edges.

The support unit 520 may extend outwardly on both sides of the funnel reflector 320 in a longitudinal direction. The support unit 520 may include the first coupling protrusions 522 and 524 and the through hole 526. The first coupling protrusions 522 and 524 may have a cylindrical shape protruding forward. The first coupling protrusions 522 and 524 may be formed to have different diameters. The diameters of the first coupling protrusions 522 and 524 may be formed to correspond to the diameters of a long hole and a short hole formed on both outer sides of the housing 330 in a longitudinal direction, respectively. The long hole and short hole may be formed to allow assembly tolerance between the funnel reflector 320 and the housing 330.

The support unit 520 may include the through hole 526. A plurality of through holes 526 may be included. The through hole 526 may allow the funnel reflector 320 to be fastened to some or all of the heat sink 300, the PCB 310, and the housing 330 by use of bolts. The through holes 526 for the heat sink 300, the PCB 310, and the housing 330 may be at the same positions as those on the funnel reflector 320.

Figure 6:
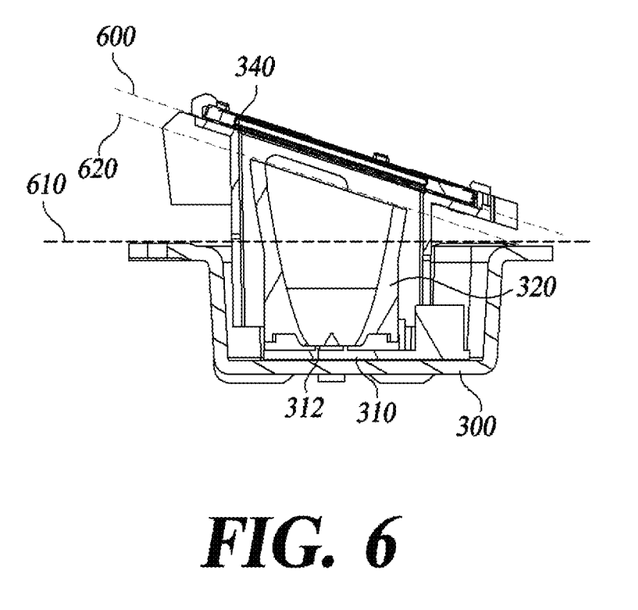
FIG. 6 is a cross-sectional view taken along the line A-A' of FIG. 4.

FIG. 6 is a cross-sectional view taken along the line A-A' of FIG. 4.

Referring to FIG. 6, when the diffuser 340 is seated on the diffuser seat, the diffuser 340 may be inclined at a predetermined angle based on the angle of the diffuser seat. Here, a first imaginary surface 600 refers to an imaginary surface parallel to the diffuser 340 inclined at an angle.

A second imaginary surface 620 refers to an imaginary surface parallel to the upper face 510 of the funnel reflector.

A third imaginary surface 610 refers to an imaginary surface parallel to an upper face of the heat sink 300.

The first imaginary surface 600 and the second imaginary surface 620 may form the same angle with respect to the third imaginary surface 610. That is, the first imaginary surface 600 and the second imaginary surface 620 are parallel to each other. The diffuser 340 may be inclined at the same angle as the upper face 510 of the funnel reflector. The diffuser 340 and the upper face 510 of the funnel reflector may be spaced apart from each other by a predetermined distance.

When light is emitted from the light source 312 to the LCD 350 via the funnel reflector 320, a leakage phenomenon may be prevented by having the upper face 510 of the funnel reflector and the LCD 350 disposed parallel to each other.

Figure 7:
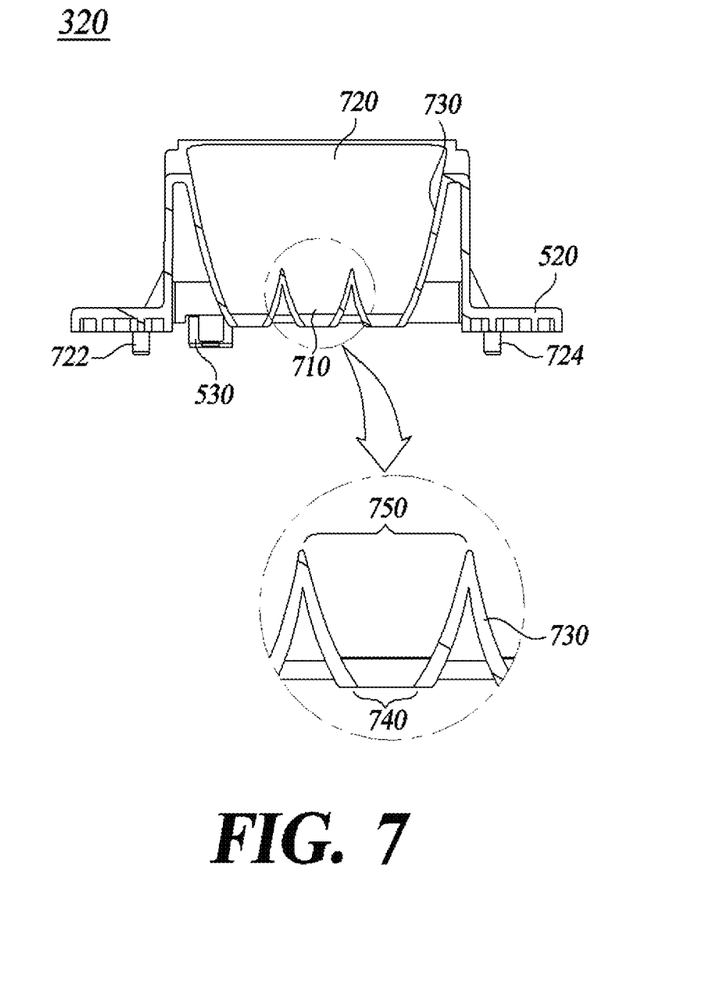
FIG. 7 is a cross-sectional view taken along the line B-B' of FIG. 5.

FIG. 7 is a cross-sectional view taken along the line B-B' of FIG. 5.

Referring to FIG. 7, the funnel reflector 320 may include all or some of a first funnel 710, a second funnel 720, second coupling protrusions 722 and 724, a snap latch 726, and an internal optical surface 730.

The internal optical surface 730 may have an internal reflection structure which is a two-layer structure. For convenience of description, the light source side is referred to as a first layer, and the LCD 350 side is referred to as a second layer. The funnel reflector 320 according to an embodiment of the present disclosure may include the first funnel 710 on the first layer and the second funnel 720 on the second layer. Here, a plurality of the first funnels 710 may be included. The second funnel 720 is a single structure including all of the plurality of first funnels 710.

The plurality of first funnels 710 may include a first funnel light reflection structure 732, a first funnel input-side opening 740, and a first funnel output-side opening 750. The first funnel light reflection structure 732 may refer to an optical surface from the first funnel input-side opening 740 to the first funnel output-side opening 750. Accordingly, a curved surface of the first funnel light reflection structure 732 may be formed based on a curved shape from the first funnel input-side opening 740 to the first funnel output-side opening 750.

Each of the first funnel input-side openings 740 is formed to correspond to each of the plurality of light sources 312 disposed on the PCB 310. Each of the first funnel input-side openings 740 is formed to be larger than its corresponding light source 312. The center of the first funnel input-side opening 740 may overlap the center of the light source 312. The output specifications of the light sources 312 and the number and arrangement of the light sources 312 disposed on the PCB 310 may be selected by taking into consideration the amount of light required for the apparatus for generating pictures 30, the size of the LCD 350, etc.

When viewed as a whole, the shape formed by the outer edges of a plurality of first funnel output-side openings 750 may correspond to the second funnel input-side opening. That is, the shape formed by the outer edges of the plurality of first funnel output-side openings 750 may be continuously in contact with the second funnel input-side opening.

A second funnel output-side opening may be formed to correspond to the image area of the LCD 350. An outermost edge of the second funnel output-side opening may be the outermost edge 512 of the internal optical surface 730.

The internal optical surface 730 of a double funnel structure including the first and second funnels 710 and 720 according to an embodiment of the present disclosure may guide light from each of the light sources 312 to the second funnel 720 through the first funnel 710. The light from the plurality of light sources passed through the plurality of first funnels 710 may be mixed with each other in the second funnel 720, pass through the diffuser 340 and then be incident on the rear of the LCD 350.

As described above, the shapes of the first and second funnels 710 and 720 may be designed by taking into consideration the pattern in which light is emitted from the light source 312 in use and the surface reflection properties of inner surfaces of the first and second funnels 710 and 720. For example, their shapes may be designed to provide a range of light diffusion angles, light homogeneity in the image area of the LCD 350, etc. required for the apparatus for generating pictures 30 by using computational simulation such as a Monte-Carlo optical ray-tracing method. The shapes may be designed to enable diffusely reflected light and specularly reflected light to be mixed while the light emitted from the plurality of LED light sources passes through the first and second funnels 710 and 720 so that the light is incident on the rear of the LCD 350 in the form of a flat light having a rectangular cross section similar to the LCD 350 and having a uniform light intensity.

According to an embodiment of the present disclosure, the first funnel light reflection structure 732 may be formed in a curved shape, e.g., a free curved shape having multiple radii.

Specifically, the first funnel light reflection structure 732 may be formed based on the positions of the plurality of light sources 312. When the funnel reflector 320 is disposed in front of the PCB 310, the plurality of light sources 312 may be located inside the first funnel input-side opening 740. When the plurality of light sources 312 are disposed in each of a plurality of first funnel input-side openings 740, the light source 312 may be located at the center of the first funnel input-side opening 740. However, even when the positions of the plurality of light sources 312 on the PCB 310 are different and they are not located at the center of the first funnel input-side opening 740, light may be uniformly emitted toward the LCD 350 based on the free curved shape of the first funnel light reflection structure 732.

The internal optical surface 730 may be sanded. Then, by the internal optical surface 730, the uniformity of light emitted to the LCD 350 may be improved. In addition, sensitivity to tolerances between parts of the apparatus for generating pictures 30 may be reduced by the internal optical surface 730. Here, the sanding may be a process of flattening protruding portions on the surface of a product by spraying fine sand, etc. together with high-pressure compressed air.

The internal optical surface 730 may be coated with aluminum. Here, the coating of aluminum may be applied by physical vapor deposition such as sputtering, an electron beam, filtered cathodic vacuum arc, thermal evaporation, and an ion beam and various types of chemical vapor deposition including plasma enhanced chemical vapor deposition. Since the internal optical surface 730 may be coated with aluminum, uniformity of thickness and color of the coating layer may be secured.

The most basic first and second funnels 710 and 720 according to an embodiment of the present disclosure may have input-side and output-side openings in a rectangular shape and a light reflection structure in which a rectangular cross section extends from the input-side opening to the output-side opening. Furthermore, it may be desirable that a cross section of the finally used light has a rectangular shape according to the shape of the LCD 350.

However, a cross section of light from the light source 312 perpendicular to the traveling direction of the light may not maintain a rectangular shape in the light path from the first funnel input-side opening 740 to the second funnel output-side opening. This is because, even when the light source 312 has a rectangular shape, the light radiated therefrom may be radiated in all directions of 360 degrees from each local light starting point and thus be in the Lambertian radiation form as described above.

The Lambertian radiation form may have a Gaussian distribution in which the intensity of a cross section of light is highest along the central axis of the light and decreases toward the periphery. For example, the radiation form of light may have a distribution where 90% of the luminous intensity is concentrated in the range of ±20 degrees based on a primary optical axis toward the front of the light source and 50% of the luminous intensity is included in the range of ±60 degrees. A 3D distribution of the intensity of light with respect to a front area of the light source 312 may vary depending on a light source used.

According to another embodiment of the present disclosure, the shape of a cross section of the first and second funnels 710 and 720 perpendicular to forward and backward directions and the shape of the light reflection structure of the first and second funnels 710 and 720 may have a shape other than a rectangle to improve the uniformity of light finally incident on the image area of the LCD 350.

Although not shown, for example, the first funnel input-side opening 740 may basically have a rectangular shape, but may have a curved shape with each side concave toward the center of the rectangular shape. In other words, a cross section of the first funnel input-side opening 740 may have a shape in which four concave curved lines are arranged in a rectangular shape, with a central portion close to the central optical axis of a light source.

The first funnel output-side opening 750 may have a similar shape. However, each side of the first funnel output-side opening 750 may be less concave than each side of the first funnel input-side opening 740. Here, a reflective surface of the first funnel light reflection structure 732 connecting the first funnel input-side opening 740 and the first funnel output-side opening 750 may not be a flat surface but a curved surface convex toward the central axis of the first funnel 710.

In this case, since the 3D light pattern in the Lambertian radiation form from the light source 312 may be specularly and diffusely reflected by the reflective surface of the first funnel light reflection structure 732, which is a convex curved surface, the shape of a cross section of light having a uniform intensity in the first funnel output-side opening 750 may change from a circular shape to a rectangular shape. Among surface reflection properties, the specular reflection may determine the overall light pattern, and the diffuse reflection may contribute to averaging of the intensity of light by spreading the reflected light.

The input-side opening of the second funnel 720 may correspond to the shape formed by the plurality of first funnel output-side openings 750, and the output-side opening of the second funnel 720 may correspond to the shape of the LCD 350. A reflective surface of the light reflection structure of the second funnel may be concave so that light incident on the LCD 350 is substantially perpendicular to the rear surface of the LCD 350.

The above-described embodiment is merely illustrative, and the detailed structures of the first and second funnels 710 and 720 may be of various shapes depending on a pattern in which light is emitted from the light source 312 and the surface reflection properties by the first and second funnels 710 and 720, and may be optimized through computational simulation.

In summary, when it comes to securing the uniformity of a light pattern, superposing a plurality of light patterns with rectangular cross sections may be more desirable than forming a single uniform rectangular light pattern by superposing a plurality of light patterns with circular cross sections. Therefore, since a pattern of a cross section of light may turn into a rectangular shape by the plurality of first funnels 710 having such a modified cross section shape, it may be possible that the uniformity of light intensity of a plurality of light patterns mixed in the second funnel 720 is more easily secured.

Referring to FIG. 5, the internal optical surface 730 may include the filleted outermost edge 512.

Based on the technical characteristics of the internal optical surface 730, in the funnel reflector 320, the brightness of light radiated to the LCD 350 may be 16,186 cd/m$^2$ or more, for example, 17,594 cd/m$^2$. In addition, the overall uniformity of light radiated to the LCD 350 may be 72% or more, for example, 76.2%.

The second coupling protrusions 722 and 724 may protrude vertically toward the rear of the support unit 520. The second coupling protrusions 722 and 724 may be formed so that the funnel reflector 320 may be coupled to the PCB 310 and the heat sink 300. The second coupling protrusions 722 and 724 may be formed in a cylindrical shape having the same diameter.

A plurality of the snap latches 726 may be included. The snap latches 726 may be respectively disposed at lower ends of both sides of the funnel reflector 320 in a lateral or width direction.

The snap latch 726 may protrude toward the rear of the funnel reflector 320 so that the funnel reflector 320 may be coupled to the PCB 310. The PCB 310 may be coupled to the rear of the funnel reflector 320 by the coupling force of the snap latch 726.

Figure 8:
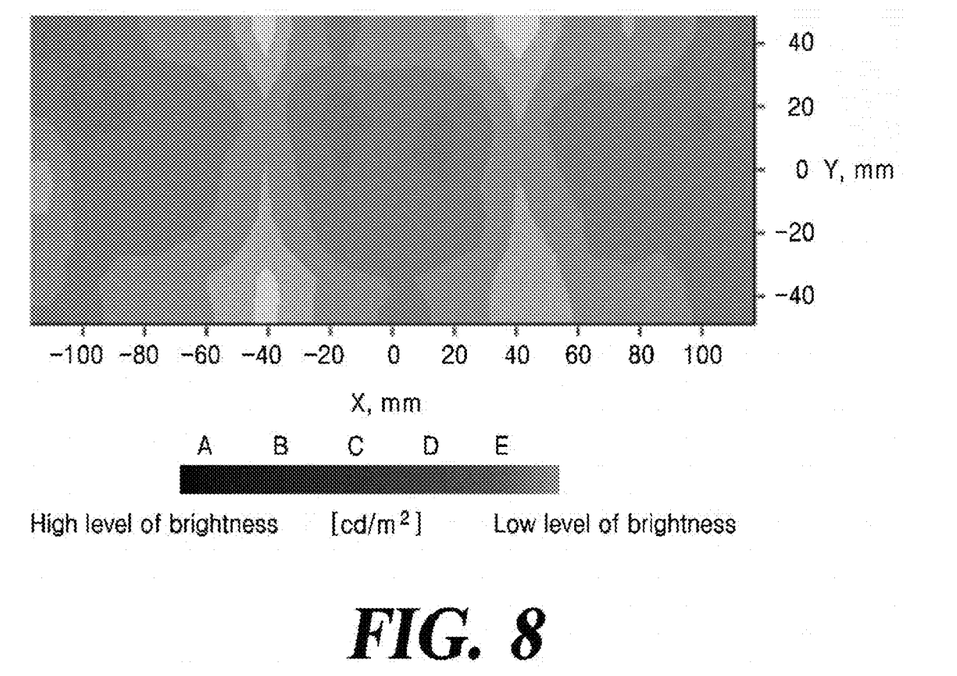
FIG. 8 is a view showing the result of a simulation of the brightness of an image according to an embodiment of the present disclosure.

FIG. 8 is a view showing the result of a simulation of the brightness of an image according to an embodiment of the present disclosure.

Referring to FIG. 5 to FIG. 8, the size of the display used for the simulation showing the distribution of the brightness of the image is 200 mm in width and 80 mm in length, which is the same size as the display in FIG. 2.

It can be seen that, compared to the distribution of the brightness of an image according to the related art disclosed in FIG. 2, the brightness of the outermost edge is improved in the distribution of the brightness of the image according to an embodiment of the present disclosure. In other words, the color of the outermost edge on the display is close to a dark color, i.e., a color corresponding to grade A. This indicates that it may be possible to enhance the brightness and overall uniformity of an image based on the technical characteristics of the funnel reflector 320 according to an embodiment of the present disclosure. Specifically, by filleting the outermost edge 512 of the funnel reflector 320, light reflected in the internal optical surface 730 may be uniformly radiated even to the outermost edge of the LCD 350. In addition, it may be possible to improve the overall uniformity of light radiated to the LCD 350 based on the free curved shape of the first funnel light reflection structure 732.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An apparatus for generating pictures for a head-up display, the apparatus comprising:
   a printed circuit board (PCB) including a plurality of light sources configured to emit light;
   a liquid crystal display (LCD) disposed in front of the plurality of light sources and configured to form a display image based on the light emitted from the plurality of light sources;
   a funnel reflector including an internal optical surface having a double funnel structure and disposed between the PCB and the LCD to guide the light toward the LCD;
   a housing having a space at which the funnel reflector is disposed and including (1) an upper surface, (2) an LCD seat disposed on the upper surface of the housing and accommodating the LCD and (3) a diffuser seat disposed at a same angle as the LCD seat on the upper surface of the housing; and
   a diffuser accommodated at the diffuser seat,
   wherein the funnel reflector includes a tapered top surface disposed at an angle corresponding to that of the diffuser seat to maintain a uniform distance from the diffuser.

2. The apparatus of claim 1, wherein:
   the double funnel structure includes (1) a plurality of first funnels respectively corresponding to the plurality of light sources and (2) a second funnel disposed in front of the plurality of first funnels,
   each of the plurality of first funnels includes a first funnel input-side opening, a first funnel output-side opening having a cross section larger than that of the first funnel input-side opening, and a first funnel light reflection structure interconnecting the first funnel input-side opening and the first funnel output-side opening, and
   the first funnel light reflection structure has a curved shape.

3. The apparatus of claim 1, wherein the internal optical surface includes a sanded surface.

4. The apparatus of claim 1, wherein the internal optical surface has an aluminum-coated surface.

5. The apparatus of claim 1, wherein an outermost edge of the internal optical surface has a curved surface.

6. The apparatus of claim 1, wherein the funnel reflector includes a plurality of snap latches respectively disposed at lower ends of both sides of the funnel reflector in a lateral direction and coupled to the PCB.

7. The apparatus of claim 1, wherein the funnel reflector includes a plurality of support units respectively extending in a longitudinal direction of the funnel reflector outside the internal optical surface and configured to fix the funnel reflector in the apparatus.

8. The apparatus of claim 7, wherein each of the plurality of support units includes:
   a plurality of coupling protrusions protruding in forward and backward directions of the plurality of support units; and
   a plurality of through holes.

9. The apparatus of claim 1, wherein the double funnel structure of the funnel reflector comprises two stacked funnel layers:
   a first layer comprising multiple funnels adjacent to the PCB, each of the multiple funnels aligned with a respective light source on the PCB; and
   a second layer comprising a main funnel disposed between the multiple funnels and the LCD, the multiple funnels optically connected to the main funnel,
   wherein each of the multiple funnels has an input with a rectangular shape, with sides of the rectangular shape having a concave shape bowed toward a center of the rectangular shape.

10. The apparatus of claim 9, wherein an output of each of the multiple funnels has a rectangular shape, with sides having a concave shape bowed toward a center of the rectangular shape, the sides of the output being less concave than the sides of the input.

11. The apparatus of claim 1, wherein the diffuser seat comprises a coupling groove into which a portion of the diffuser is fitted.

12. The apparatus of claim 1, the funnel reflector comprising a support unit extending from both sides of an upper end of the funnel reflector, the support unit comprising a plurality of coupling protrusions, the coupling protrusions having respectively different diameters.

13. An apparatus for generating pictures for a head-up display, the apparatus comprising:
   a printed circuit board (PCB) including a plurality of light sources configured to emit light;
   a liquid crystal display (LCD) disposed in front of the plurality of light sources and configured to form a display image based on the light emitted from the plurality of light sources; and
   a funnel reflector including an internal reflective optical surface disposed between the PCB and the LCD to guide the light toward the LCD;

wherein the funnel reflector comprises:
- a first layer comprising multiple funnels adjacent to the PCB, each of the multiple funnels aligned with a respective light source on the PCB; and
- a second layer comprising a main funnel disposed between the multiple funnels and the LCD, the multiple funnels optically connected to the main funnel,
- wherein each of the multiple funnels has an input with a rectangular shape, with sides of the rectangular shape having a concave shape toward a center of the rectangular shape.

14. The apparatus of claim 13, wherein an outermost edge of the optical surface of the funnel reflector is filleted to be a curved surface.

15. The apparatus of claim 13, wherein each light source on the PCB extends into and inside an input of one of the multiple funnels.

16. The apparatus of claim 13, wherein an output of each of the multiple funnels has a rectangular shape, with sides of the rectangular shape having a concave shape toward a center of the rectangular shape, the sides of the output being less concave than the sides of the input.

17. The apparatus of claim 13, further comprising:
- a housing having a space at which the funnel reflector is disposed and including (1) an upper surface, (2) an LCD seat disposed on the upper surface of the housing and accommodating the LCD and (3) a diffuser seat disposed at a same angle as the LCD seat on the upper surface of the housing; and
- a diffuser accommodated at the diffuser seat.

18. The apparatus of claim 13, wherein the funnel reflector includes a tapered top surface disposed at an angle corresponding to that of the diffuser seat to maintain a uniform distance from the diffuser.

19. An apparatus for generating pictures for a head-up display, the apparatus comprising:
- a plurality of light sources configured to emit light;
- a liquid crystal display (LCD) disposed in front of the plurality of light sources and configured to form a display image based on the light emitted from the plurality of light sources; and
- a funnel reflector including an internal reflective optical surface, the funnel reflector being disposed between the light sources and the LCD to guide the light to the LCD;

wherein the funnel reflector comprises:
- a first layer comprising multiple funnels adjacent to the light sources, each of the multiple funnels aligned with a respective light source; and
- a second layer comprising a main funnel disposed between the multiple funnels and the LCD, the multiple funnels optically connected to the main funnel;
- wherein each of the multiple funnels has an input with a rectangular shape, with sides of the rectangular shape having a shape concaved toward a center of the rectangular shape.

20. The apparatus of claim 19, wherein an output of each of the multiple funnels has a rectangular shape, with sides of the rectangular shape having a shape concaved toward a center of the rectangular shape, the sides of the output being less concaved than the sides of the input.

* * * * *